US005971885A

United States Patent [19]

Greenwood et al.

[11] Patent Number: 5,971,885

[45] Date of Patent: Oct. 26, 1999

[54] ROLLER ASSEMBLY

[75] Inventors: Christopher John Greenwood; Leslie Kendrick Robinson, both of Preston; Mervyn John George Patterson, Chorley, all of United Kingdom

[73] Assignee: Torotrak (Development) Limited, Lancashire, United Kingdom

[21] Appl. No.: 09/163,488

[22] Filed: Sep. 30, 1998

Related U.S. Application Data

[63] Continuation of application No. PCT/GB97/00735, Mar. 17, 1997.

[30] Foreign Application Priority Data

Apr. 1, 1996 [GB] United Kingdom ................... 9606897

[51] Int. Cl.[6] ................................................ F16H 57/04

[52] U.S. Cl. ................................... 476/8; 476/40; 476/14

[58] Field of Search ................................... 476/40, 8, 14; 184/13.1, 11.2, 6.26; 74/467

[56] References Cited

U.S. PATENT DOCUMENTS

| | | | |
|---|---|---|---|
| 1,981,910 | 11/1934 | Ehrlich | 476/1 |
| 2,014,920 | 9/1935 | Almen et al. | 476/42 |
| 4,369,667 | 1/1983 | Kemper | 476/8 |
| 4,464,946 | 8/1984 | Kraus | 74/467 |

*Primary Examiner*—John A. Jeffery
*Assistant Examiner*—David Fenstermacher
*Attorney, Agent, or Firm*—Davis and Bujold

[57] ABSTRACT

A roller assembly (10) for use in a toroidal-race rolling-traction variator or like device includes a roller mounted in a carriage (19) which is provided with passageways (33) so that cooling oil from the variator lubrication circuit can be sprayed on to the roller rim via apertures in the carriage and/or in two specially-located spray-bars 38,39 extending from the carriage.

12 Claims, 4 Drawing Sheets

ROLLER ASSEMBLY

This is continuation of PCT/GB97/00735 filed Mar. 17, 1997.

This invention relates to rollers, and to cooling them in use. It relates especially, but not exclusively, to rollers that must rotate at high speed and under high loading from two opposed surfaces which contact the roller at opposite ends of a diameter, so squeezing the roller between them. The invention thus relates particularly to the rollers used in the variators of the toroidal-race rolling traction type.

In such variators, the cooling of the discs and rollers and of the traction fluid is always an important consideration. As is well understood in the art, the fluid must always be present in the form of a thin film between the rollers and the toroidal races of the discs, to prevent metal-to-metal contact, so that traction is transmitted between discs and rollers by way of shear generated within the thin film. In practice the waste heat generated within the film, in an instant during which it is transmitting traction, is quickly dissipated an instant later when that particular volume of fluid will have moved clear of the "nip" between race and rollers. As to the discs, the heat conductivity of the hardened steel they are made of is not particularly high. However, the total area of each race is high compared with the areas of instantaneous contact with its cooperating rollers, and the location of those areas of contact tends to change frequently because the ratio transmitted by the variator is also continually changing. Conventional lubrication techniques are therefore usually sufficient to prevent overheating of the discs.

With the rollers it is different, however: the heat input is always concentrated at the circumference. The concentration of the heat input is aggravated by the fact that the roller rim is in practice rounded to a cross-radius, so that the instantaneous "contact" between roller and race, by way of the intervening film of traction fluid, tends to be small when measured in a direction parallel to the roller axis.

British patent application number GB-A-2282196 discloses a roller assembly for the above type of variator in which cooling fluid is provided to the roller surface via a hollow roller support arm. The fluid is passed through a single outlet positioned opposite the roller outer surface and bathes the roller in cooling fluid.

It is an object of the present invention to provide an improved apparatus for the cooling of such rollers.

Accordingly, the present invention provides a roller assembly for use in a toroidal-race rolling-traction variator comprising a roller mounted in a carriage and ducting for introducing flows of cooling liquid to the roller thereby to remove heat from the roller during operation of the device, in which the ducting includes at least two mutually opposed outlets positioned for directing cooling liquid onto opposing portions of the roller.

Preferably, the outlets comprise a pair of outlets within the roller carriage and said outlets are positioned for directing cooling liquid onto an outer contacting surface of the roller.

Advantageously, each outlet includes two apertures, each aperture being angled relative to the other so as to direct a stream of cooling liquid onto a different portion of the outer contacting surface of the roller.

In a particularly advantageous arrangement the apertures are angled relative to each other such as to direct cooling fluid both upstream and downstream thereof.

In an alternative or additional arrangement the assembly includes one or more spray bars extending part-way around but radially spaced from the roller rim.

Preferably, each spray bar includes a plurality of outlets for directing cooling liquids onto the roller.

Advantageously, the outlets comprise nozzles operative to direct a stream of cooling fluid onto the roller.

In a particularly advantageous arrangement the or each spray bar is positioned to direct the cooling liquid at or near to the position at which the roller makes contact with some other part of the device.

For best results, the or each spray bar is positioned to direct the cooling liquid at or near to the position at which the roller loses contact with the said other part of the device.

Conveniently, the cooling liquid is accessed from the lubrication circuit of a device in which, in use, it is mounted.

The present invention also provides a roller assembly for use in a toroidal-race rolling-traction variator comprising a roller mounted in a carriage operably connected to a double acting piston of a roller control cylinder, said control cylinder including a stem connecting the piston to the carriage and having a passage therethrough for the transportation of cooling fluid to the roller, said stem having an end face exposed to a pressurising effect of the cooling fluid and the double acting piston having a confronting surface also exposed to the pressurising effect of the cooling fluid, such that any axial load on the stem is at least partially counteracted by an opposite effect on the confronting surface of the double acting piston.

Advantageously, the mutually confronting surfaces act to define a cavity into which the fluid is provided and the assembly further includes an axially extending supply pipe extending into the cavity for supplying fluid thereto.

Conveniently, the arrangement further comprises an axially extending passage in the double acting piston positioned for receiving the supply of fluid and being moveable relative to the supply pipe such as to facilitate the supply of fluid to the cavity regardless of the axial position of the piston.

Embodiments of the invention will now be described, by way of example only, with reference to the accompanying drawing in which.

Figure 1:
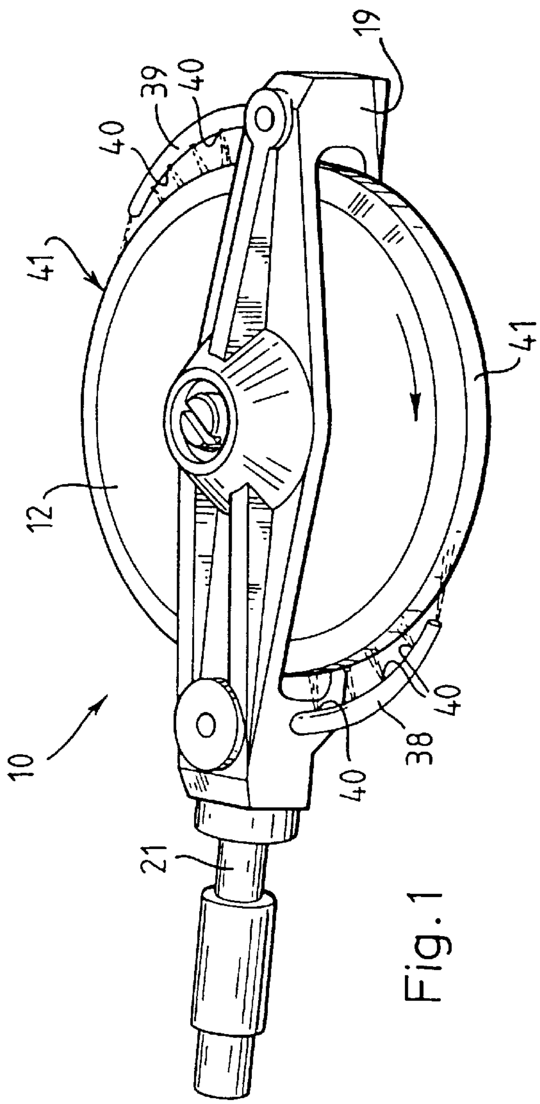
FIG. 1 is a perspective view of a roller assembly for use in a variator of the toroidal-race rolling-traction type (not shown)

In the roller assembly 10 illustrated in the drawings, reference numeral 12 indicates the roller and numerals 14,15 indicate the bearings by which it is mounted for rotation on a central shaft 17 in a supporting carriage 19. The roller supporting part of the carriage 19 is secured to a stem section 21. At its proximal end 21*a*, the stem 21 is in turn supported by a spherical joint 23 in the piston 25 of a roller control cylinder 27 of known type. Movement of the piston is achieved by varying the pressures on either side of the piston. The proximal end 21*a* is open and moves within a hollow plug 29 which is accepted in an appropriate mounting socket shown schematically at 32 on the variator casing to secure the roller 10 assembly in place in the variator (see FIG. 6).

Figure 2:
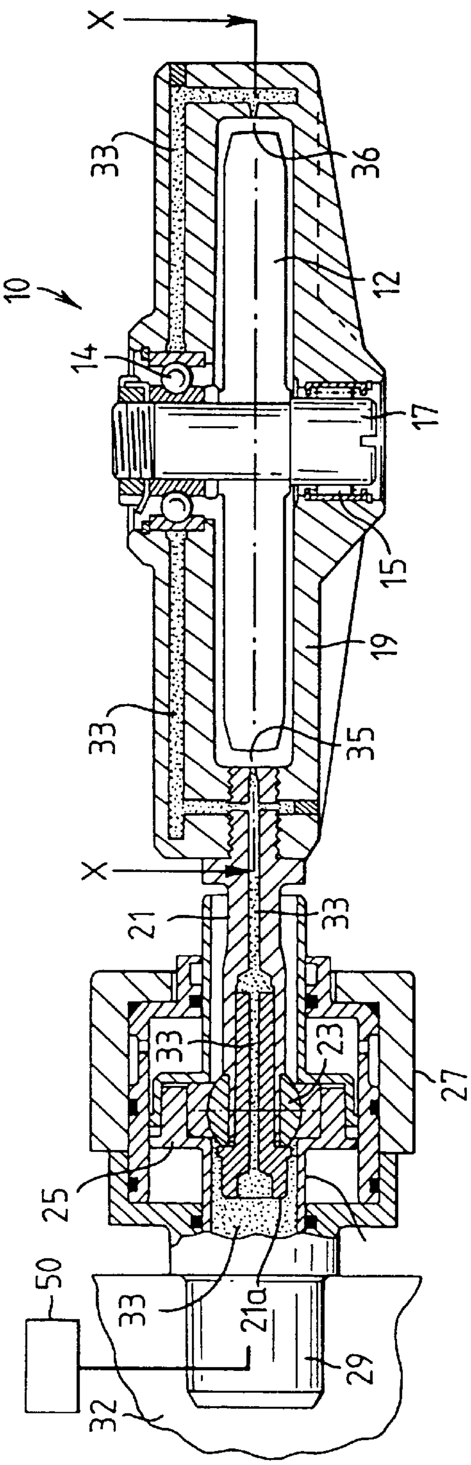
FIG. 2 is an axial section both of this assembly and of an alternative design of roller assembly.

From FIG. 2, it will be observed that the roller carriage 19 and the piston stem 21 are provided with a network of passageways 33. This enables cooling liquid e.g. oil diverted from, for example, the variator's lubrication circuit shown schematically at 50, to be fed via the mounting socket 32 etc. through the roller carriage 19 to two discharge apertures 35,36 adjacent the roller rim.

The discharge apertures are best provided in the form of nozzles capable of creating a spray or stream (jet) of cooling fluid and directing it onto an appropriate portion of the roller 12. Whilst the cross-section of FIG. 2 illustrates a simple convergent nozzle, it will be appreciated that various forms of nozzles thereof may be used and that the final form depends on the required flow pattern.

In the preferred embodiment of FIG. 1, however, the roller assembly is alternatively or additionally provided with two curved spray bars 38,39 extending part-way around the roller rim downstream of the (fixed) locations 41 at which the rim makes contact with the variator input and output discs, and, advantageously, the two spray bars terminate in end nozzles or apertures 40 operative to direct streams of cooling liquid at or just downstream of the contact locations 41 at which point it is hottest, so as to maximise the cooling effect there. As shown the nozzles are positioned close to the point at which it is desired to direct the cooling fluid and are such as to create a discrete flow of fluid. Such an arrangement provides a particularly effective method of cooling the roller surface and is, therefore, of benefit when a higher cooling rate is required. The broken lines in FIG. 1 diagrammatically indicate the streams of cooling fluid provided by the spray bars 38,39 in operation of the assembly. The nozzles 35, 36 of FIG. 2 also benefit from being close to the roller surface 41 and are also, preferably, provided in the form of stream creating nozzles.

Figure 3:
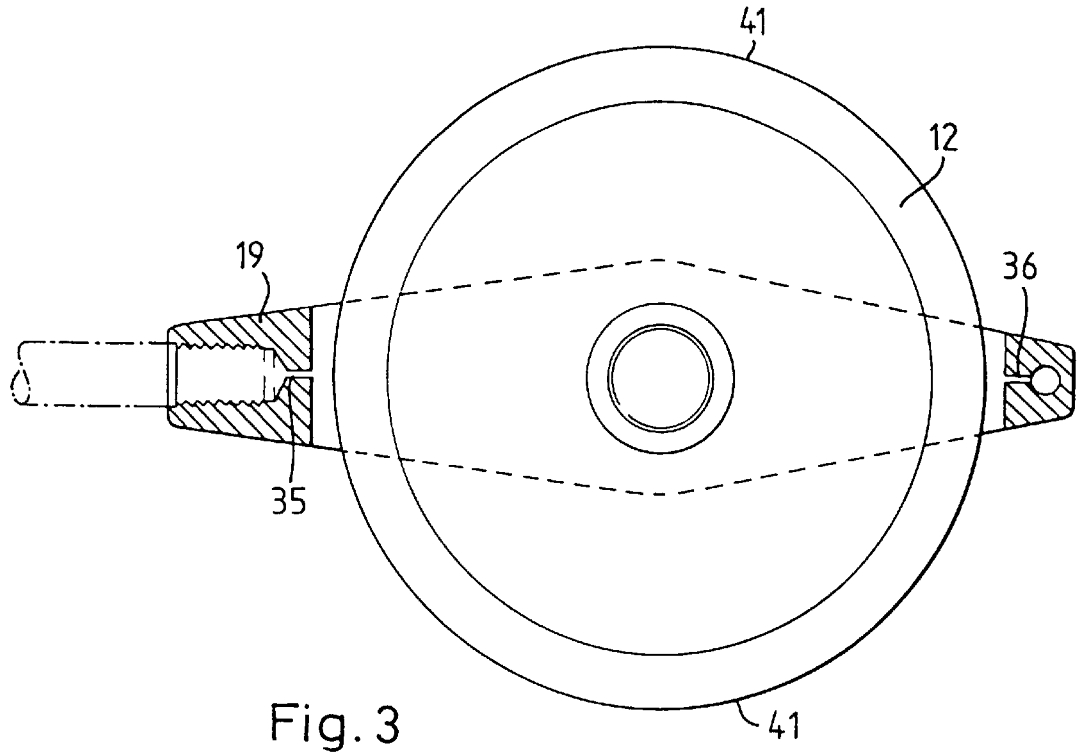
FIG. 3 is a partial cross-sectional view taken in the direction of arrows x—x of FIG. 2 and illustrates a first arrangement of the discharge apertures.
Figure 4:
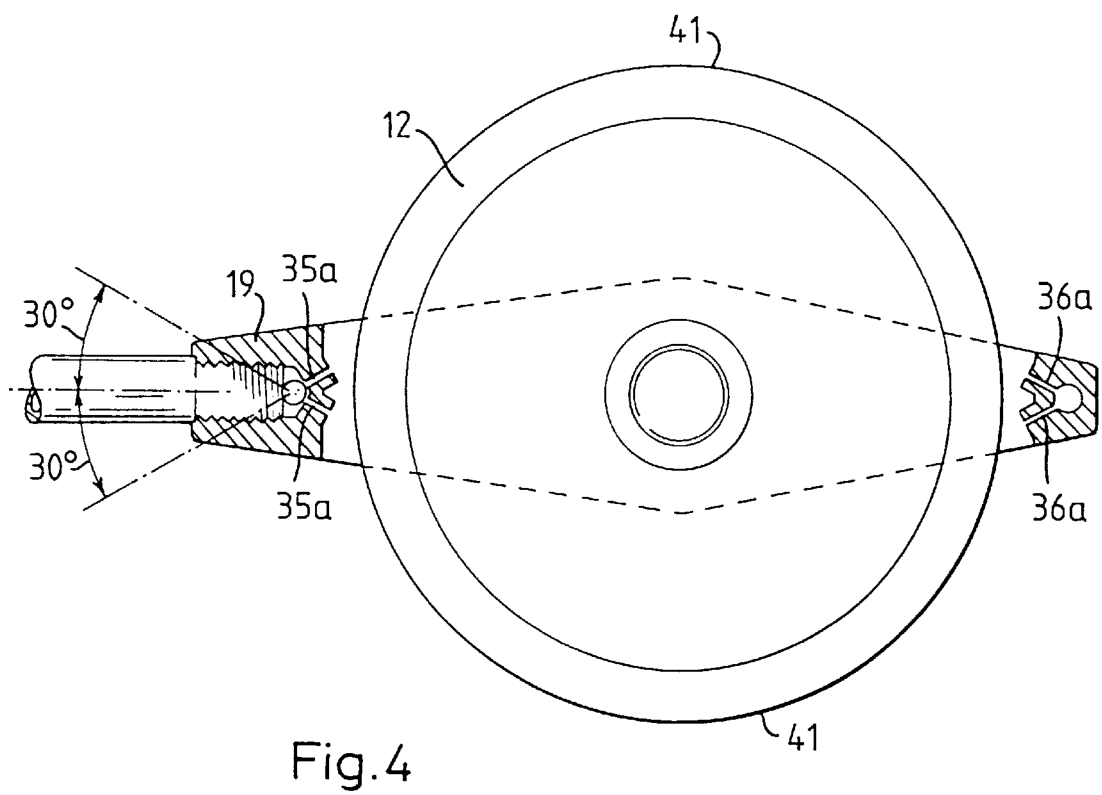
FIG. 4 is a partial cross-sectional view taken in the direction of arrows x—x of FIG. 2 and illustrates a second arrangement of the discharge apertures.

Referring now to FIGS. 3 and 4, it will be appreciated that, in the simple form of the present invention i.e. an arrangement without spraybars 32, 39, one may employ a number of nozzle or aperture arrangements. For example, one might employ the arrangement of FIG. 3 in which a pair of mutually opposed nozzles 35, 36 are provided at opposite sides of the carriage 19 (see also FIG. 2) and positioned for directing a spray or stream towards each other such that the cooling fluid is deposited onto surface 41 of the roller 12. As shown in FIG. 4, one could employ a plurality of nozzles or apertures on each side of the carriage 19. In the particular example of FIG. 4, a pair of nozzles 35*a*, 35*b*, 36*a*, 36*b* are provided on each side of the carriage 19. The nozzles of the first pair 35*a*, 35*b* are each angled relative to each other such that they direct fluid flow onto different areas of roller 12. Preferably, the nozzles of each pair are angled relative to each other such that one directs a stream of fluid upstream of their position whilst the other directs fluid downstream thereof. The nozzles of the other pair 36*a*, 36*b* are similarly positioned and directed. Whilst the actual angular position is very much dependent upon the specific requirements of the apparatus, it has been found that by angling one nozzle upstream at an angle of approximately 30° longitudinal axis of the roller assembly and the other downstream at a similar angle provides an effective cooling pattern without excess diffusion taking place before the spray contacts the roller surface 41. Other possibilities will, however, present themselves to a person skilled in the art. Additionally, it will be possible to employ a combination of nozzle arrangements from FIGS. 3 and 4.

Figure 5:
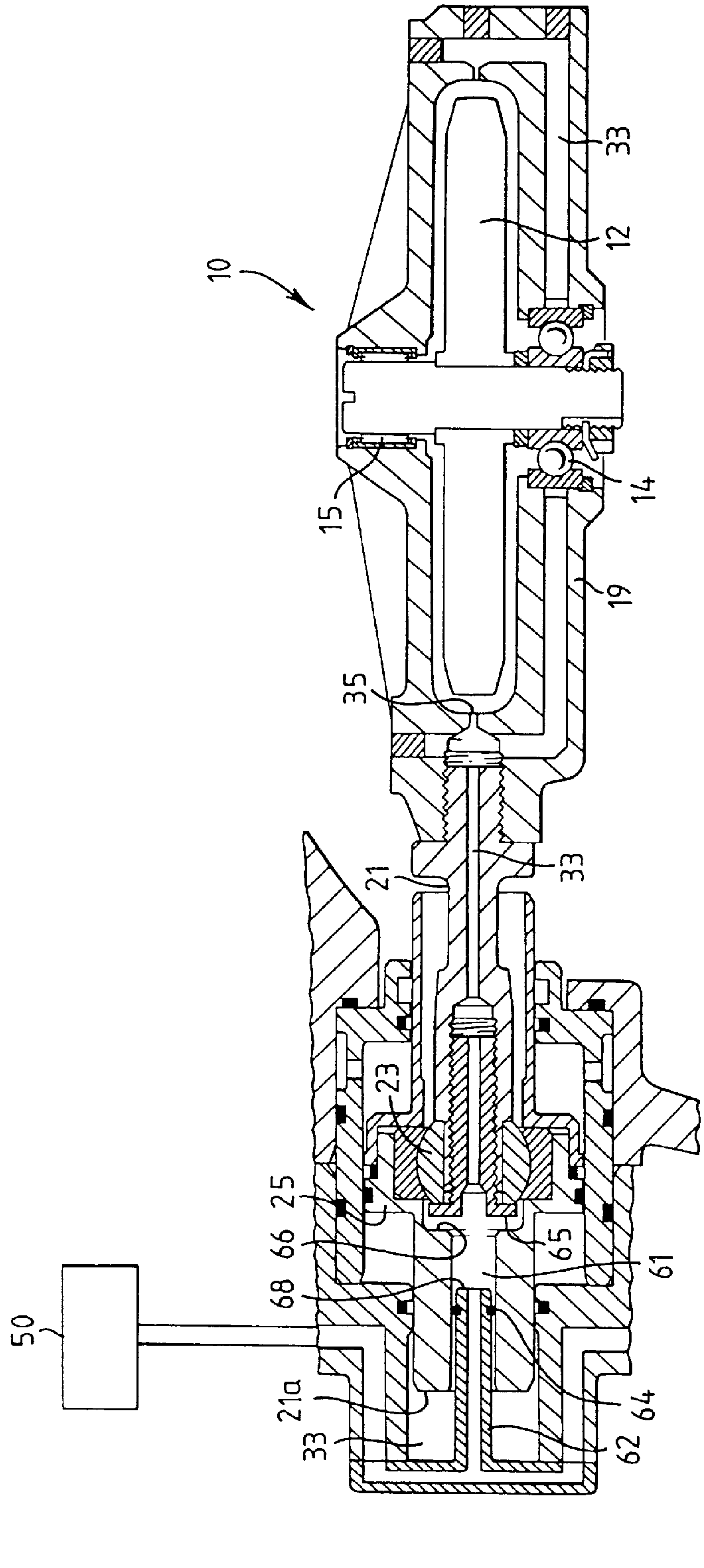
FIG. 5 is a cross-sectional view of an alternative form of roller assembly.

FIG. 5 illustrates an alternative form of roller assembly 10 substantially the same as that shown in FIG. 2 save for the features associated with the supply of cooling fluid to the proximal end 2 la of stem 21. In this particular arrangement, the cooling fluid is supplied to the interior 60 of the stem 21 via an axially extending supply pipe 62. This pipe is provided with an annular seal 64 which prevents fluid seeping out into region 33 in which it could act against proximal end 21 a and affect the axial position of the roller. The supply pipe extends into a cavity 61 formed between an end face 65 of stem 21 and a confronting surface 65 of the double acting piston 25. It will be appreciated that by extending the supply pipe into the piston portion 25 of the roller mechanism, the fluid pressure will act against surface 64 but the effect thereof will be counteracted by the pressure exerted on confronting surface 66 which is part of the piston assembly 25. Any effect that the pressurised cooling fluid might have on the axial position of the roller assembly may be minimised or possibly eliminated by suitable sizing of the two confronting surfaces 65, 66. A small movement effect will be present due to the existence of an end surface 68 on the supply duct, but this might also be reduced or even eliminated by careful design. As shown in FIG. 5, the supply pipe 62 extends axially onto an axially extending passage formed in the double acting piston 25 which, in operation, slides over the supply pipe 62 as it moves back and forth, thereby to ensure effective supply of fluid to the cavity regardless of the axial position of the piston 25.

Figure 6:
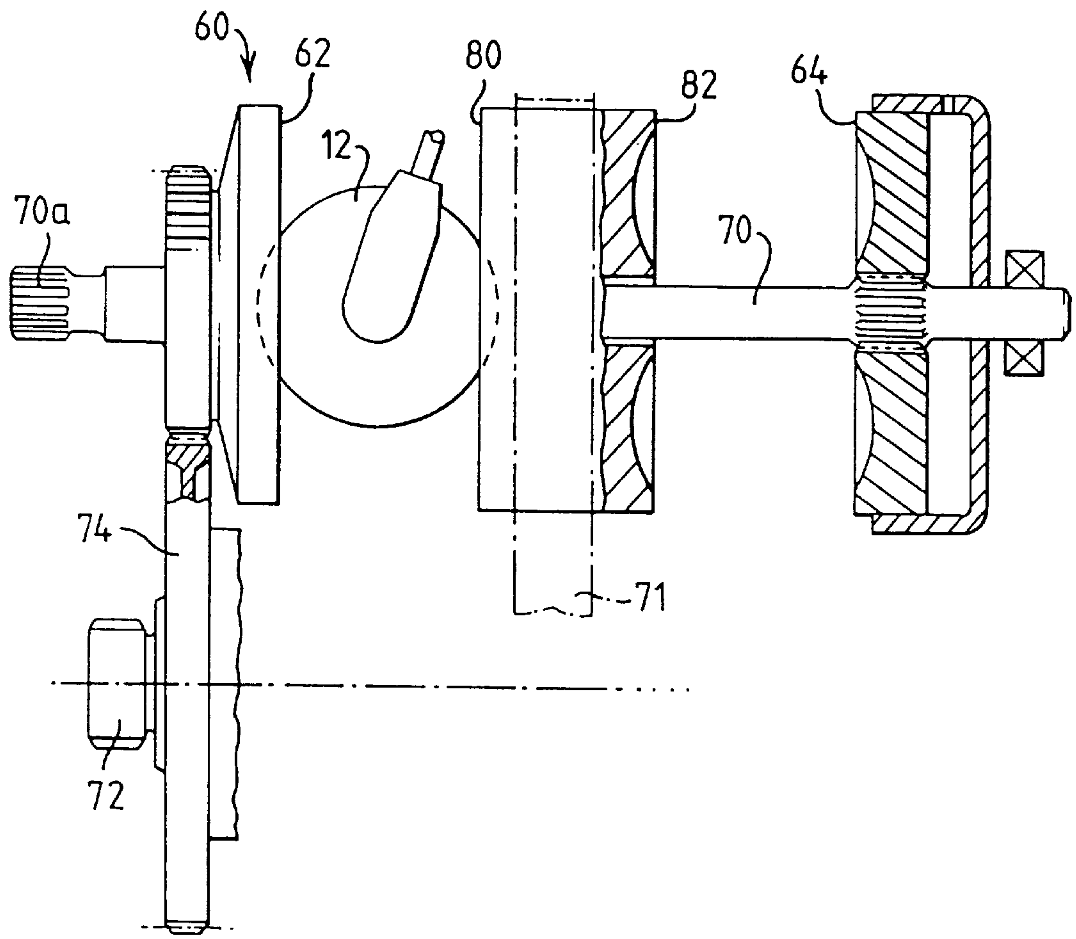
FIG. 6 is a schematic representation of a continuously-variable transmission of the type in which rollers of the present invention may be incorporated.

Referring now briefly to FIG. 6, a variator suitable for use with the newly proposed roller assemblies 10 comprises a pair of input roller discs 62,64 and a pair of output roller discs 80, 82 all of which are mounted on input shaft 70 in a manner well known in the art and therefore not described further herein. A first end 70*a* of the shaft is driven by, for example, a vehicle's engine and rotation thereof is passed to the output discs 80, 82 via the input discs and the rollers 12 positioned therebetween. The output discs 80, 82 are linked via a chain drive 71 to an epicyclic gearbox (not shown ) which in turn drives output shaft 72 connected to, for example, the vehicle's transmission. A gear wheel 74 provided on output shaft 72 is clutchably engageable to the shaft and meshes with a permanently engaged gear on the input shaft 70 thereby to provide direct drive to the output shaft whenever desirable. The variator as described is of conventional form save for the roller assemblies which are as described above and as shown in FIGS. 1 to 5 of the attached drawings.

We claim:

1. A roller assembly for use in a toroidal-race rolling-traction variator comprising a roller (12) mounted in a carriage (19) and ducting introducing flows of cooling fluid to the roller thereby to remove heat from the roller during operation of the roller assembly, said ducting including at least two mutually opposed outlet (35, 36) positioned to direct cooling fluid onto opposing portions of the roller, wherein each outlet (35,36) includes two or more apertures being angled relative to one another so as to direct a stream of cooling fluid onto different portions of an outer contacting surface of the roller (12).

2. The assembly of claim 1, in which said carriage comprises said two opposed outlets (35, 36) which are positioned to direct cooling fluid onto said outer contacting surface of the roller (12).

3. The assembly of claim 1, in which said apertures are angled relative to one another such as to direct cooling fluid both upstream and downstream onto said outer contacting surface of the roller (12).

4. The assembly of claim 1, comprising at least one spray bar which extends part-way around but radially spaced from the outer contacting surface of the roller (12).

5. The assembly of claim 4, in which said at least one spray bar includes a plurality of said outlets (40).

6. The assembly of claim 4, in which at least one spray bar is positioned such as to direct the cooling fluid at or near to a position at which said roller makes or loses contact with another part of the variator.

7. The assembly of claim 1, in which said outlets comprise nozzles.

8. The assembly of claim 1, in which the cooling fluid is accessed from a lubrication circuit of the variator in which, in use, said assembly is mounted.

9. The roller assembly as claimed in claim 1, in which said carriage (19) is operably connected by means of a stem (21) to a double acting piston (25) of a roller control cylinder (27), said stem (21) has a passageway (33) therethrough to transport cooling fluid to said ducting, said stem (21) has an end face exposed to a pressurizing effect of the cooling fluid, and said double acting piston (25) has a confronting surface also exposed to the pressurizing effect of the cooling fluid, such that any axial load on the stem (21) is at least partially counteracted by an opposite effect on the confronting surface of said double acting piston (25).

10. The assembly of claim 9, in which the mutually confronting surfaces act to define a cavity (61) into which the cooling fluid is provided and the assembly further comprises an axially extending supply pipe (62) extending into said cavity to supply fluid thereto.

11. The assembly of claim 10, further comprising an axially extending passage in the double acting piston positioned to receive the supply of fluid and being movable relative to the supply pipe such as to facilitate the supply of fluid to the cavity regardless of the axial position of the piston.

12. A toroidal-race rolling-traction variator including one or more roller assemblies as claimed in claim 1.

* * * * *